(12) United States Patent
Youm et al.

(10) Patent No.: US 7,368,889 B2
(45) Date of Patent: May 6, 2008

(54) MOTOR CONTROL APPARATUS AND CONTROL METHOD THEREOF

(75) Inventors: Jang-hyoun Youm, Kyungki-do (KR); Jong-pill Park, Kyungki-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 36 days.

(21) Appl. No.: 10/689,084

(22) Filed: Oct. 21, 2003

(65) Prior Publication Data
US 2004/0160208 A1 Aug. 19, 2004

(30) Foreign Application Priority Data
Feb. 14, 2003 (KR) .................. 10-2003-0009430

(51) Int. Cl.
*H02P 27/04* (2006.01)
(52) U.S. Cl. .................. 318/801; 318/375; 318/376; 318/759
(58) Field of Classification Search .......... 318/801
See application file for complete search history.

(56) References Cited

U.S. PATENT DOCUMENTS

| | | | | |
|---|---|---|---|---|
| 4,093,900 A | * | 6/1978 | Plunkett | 318/370 |
| 4,284,936 A | * | 8/1981 | Bailey et al. | 318/381 |
| 4,295,086 A | * | 10/1981 | Cutler et al. | 318/759 |
| 4,426,606 A | * | 1/1984 | Suita et al. | 318/375 |
| 4,764,060 A | | 8/1988 | Khurana | |
| 5,376,867 A | * | 12/1994 | Capetti | 318/376 |
| 5,847,533 A | * | 12/1998 | Hakala et al. | 318/798 |
| 5,914,582 A | * | 6/1999 | Takamoto et al. | 318/801 |
| 6,315,081 B1 | * | 11/2001 | Yeo | 187/290 |
| 6,369,538 B1 | * | 4/2002 | Youn et al. | 318/362 |
| 6,713,979 B2 | * | 3/2004 | Naito et al. | 318/280 |

FOREIGN PATENT DOCUMENTS

EP 1 162 726 A1 12/2001

(Continued)

OTHER PUBLICATIONS

Notice of Official Action issued on Jan. 7, 2005 by the Korean Intellectual Property Office in the corresponding Korean Application No. 10-2003-0009430 (2 pages) (1 page English translation).

*Primary Examiner*—Lincoln Donovan
*Assistant Examiner*—Renata McCloud
(74) *Attorney, Agent, or Firm*—Staas & Halsey LLP

(57) ABSTRACT

A motor control apparatus supplying AC power to a motor having a plurality of motor windings having an inverting part including a bridge circuit having a plurality of switching units, and supplying the AC power to the motor; brake relays short circuiting the motor windings by turning on when the motor brakes; brake resistors, respectively, connected to the motor windings and consuming an overcurrent generated from the motor when the brake relays short circuit the motor windings; and a switching controller turning on and turning off the switching units provided in one of opposite ends of the inverting part so that the overcurrent consumed by the brake resistors is changeable in proportion to a rotation speed of the motor, when the brake relays short circuit the motor windings to improve an effect of a dynamic braking operation and to prevent breakdown thereof.

14 Claims, 5 Drawing Sheets

| | FOREIGN PATENT DOCUMENTS | | |
|---|---|---|---|
| JP | 01283079 A | * | 11/1989 |
| JP | 8-37678 | | 2/1996 |
| JP | 11-206184 | | 7/1999 |
| JP | 11206184 A | * | 7/1999 |
| JP | 2000-270577 | | 9/2000 |
| JP | 2000270577 A | * | 9/2000 |
| JP | 2001037293 A | * | 2/2001 |
| KR | 10-331831 | | 4/2001 |
| KR | 2002-1768 | | 1/2002 |
| WO | WO 2003050940 A1 | * | 6/2003 |

* cited by examiner

MOTOR CONTROL APPARATUS AND CONTROL METHOD THEREOF

CROSS-REFERENCE TO RELATED APPLICATION

This application claims the benefit of Korean Patent Application No. 2003-9430, filed Feb. 14, 2003, in the Korean Intellectual Property Office, the disclosure of which is incorporated herein by reference.

BACKGROUND OF THE INVENTION

1. Field of the Invention

The present invention relates to a motor control apparatus and a control method thereof, and more particularly, to a motor control apparatus and a control method thereof changing an overcurrent, which is generated in the motor, consumed by a brake resistor according to a rotation speed of the motor.

2. Description of the Related Art

A three-phase motor has a coil with a triangular winding. A motor control apparatus 300 for supplying AC power to drive a motor 100, as shown in FIG. 1, comprises a rectifying circuit part 110 to rectify commercial AC power (110V/220V) supplied from an AC power supply 200, and an inverting part 120 inverting the commercial AC power rectified by the rectifying circuit part 110 to AC power having various frequencies and supplying the AC power having the various frequencies to the motor 100.

The rectifying circuit part 110 generally comprises a diode rectifying circuit 111 rectifying the commercial AC power (110V/220V) supplied from the AC power supply 200 into DC power, and a capacitor 113 smoothing the DC power rectified by the diode rectifying circuit 111 into a predetermined voltage and transmitting the smoothed DC power to the inverting part 120.

The inverting part 120 comprises a bridge circuit provided with a plurality of first switching units 121, each having a first transistor 121a, and a first diode 121b connected to each other in parallel and a plurality of second switching units 123, each have a second transistor 123a and a second diode 123b. Respective ones of the first and second switching units 121 and 123 are provided in pairs in respective bridges of the bridge circuit, and tap nodes between the first and second switching units 121 and 123 of each of the respective bridges are connected to respective motor windings of the motor 100 via power input ends 100b of the motor 100.

The first and second switching units 121 and 123 are turned on and off by a switching controller 140 to provide the AC power having the various frequencies to supply to the motor 100.

A conventional motor control apparatus may comprise a dynamic braking circuit 130 performing a dynamic braking operation. The dynamic braking circuit 130 comprises a pair of brake relays 131 producing an open circuit or a short circuit in the motor windings of the motor 100, and three brake resistors 133 connected to each motor winding to consume an overcurrent generated in the motor 100 when the motor 100 brakes. The brake relay 131 is turned on when the motor 100 brakes or when the motor 100 stops, and short circuits the motor windings of the motor 100 by being turned on, to suddenly brake the motor 100 or to prevent the motor 100 from rotating by an external force when the motor 100 is stopped. The overcurrent generated from the motor windings when the motor 100 suddenly brakes is consumed through the brake resistors 133 so that the motor 100 or the brake relays 131 is prevented from breaking down by the overcurrent.

According to the conventional motor control apparatus 300, a resistance of the brake resistors 133 to consume the overcurrent generated when the motor 100 suddenly brakes depends on the overcurrent generated when the motor 100 brakes. For example, if a rotation speed of the motor 100 is high, the overcurrent generated when the motor 100 brakes is high so that high-resistance resistors are used as the brake resistors 133. If the rotation speed of the motor 100 is low, the overcurrent generated when the motor 100 brakes is low, so that low-resistance resistors are used as the brake resistors 133.

The low-resistance resistors are relatively advantageous for the dynamic braking circuit 130 to perform the dynamic braking operation, compared with the high-resistance resistors. The reason is that when the dynamic braking operation short circuits the motor windings of the motor 100 such that the resistances of the motor windings are close to "0", an effect thereof is maximized with low resistance resistors. Thus, when the high-resistance resistors are used as the brake resistors 133, an operational effect of the dynamic braking operation is decreased. However, when the low-resistance resistors are used as the brake resistors 133, the motor 100 or the brake relays 131 may be damaged by the overcurrent generated when the motor 100 brakes.

SUMMARY OF THE INVENTION

Accordingly, it is an aspect of the present invention to provide a motor control apparatus and a control method thereof changing an overcurrent, which is generated in the motor, consumed by a brake resistor according to a rotation speed of the motor.

Additional aspects and/or advantages of the invention will be set forth in part in the description which follows and, in part, will be obvious from the description, or may be learned by practice of the invention.

The above and/or other aspects are achieved by providing a motor control apparatus supplying AC power to a motor having a plurality of motor windings, comprising: an inverting part comprising a bridge circuit having a plurality of switching units, and supplying the AC power to the motor; brake relays short circuiting the motor windings by turning on when the motor brakes; brake resistors connected to respective ones of the motor windings and consuming an overcurrent generated from the motor when the brake relays short circuits the motor windings; and a switching controller turning on and turning off the plurality of switching units provided in one of opposite ends of the inverting part so that the overcurrent consumed by the brake resistors is changeable in proportion to a rotation speed of the motor, when the brake relays short circuits the motor windings.

In an aspect, the overcurrent consumed by the respective brake resistors is changed in proportion to a duty cycle of the switching units turned on and turned off by the switching controller.

In an aspect the motor control apparatus further comprises a speed detecting part detecting the rotation speed of the motor, wherein the switching controller turns on and turns off the plurality of switching units so that the duty cycle of the switching units is in proportion to the rotation speed of the motor detected by the speed detecting part.

In an aspect, the respective switching units of the inverting part comprise transistors and diodes connected to each other in parallel.

The above and/or other aspects are achieved by providing a control method of a motor control apparatus having an inverting part comprising a bridge circuit having a plurality of switching units, and supplying AC power to motor windings of a motor, and brake resistors connected to the motor windings and consuming an overcurrent generated from the motor when the motor brakes, comprising: braking the motor by short circuiting the motor windings; and turning on and turning off the switching units provided in one of opposite ends of the inverting part so that the overcurrent consumed by the brake resistors is changeable according to a rotation speed of the motor.

In an aspect, the overcurrent consumed by respective ones of the brake resistors is changed in proportion to a duty cycle of the switching units turned on and turned off.

In an aspect, the control method of the motor control apparatus further comprises detecting the rotation speed of the motor, wherein turning on and turning off the plurality of switching units comprises turning on and turning off the plurality of switching units according to the duty cycle changed in proportion to the detected rotation speed of the motor.

BRIEF DESCRIPTION OF THE DRAWINGS

These and/or other aspects and advantages of the invention will become apparent and more readily appreciated from the following description of the embodiments, taken in conjunction with the accompany drawings of which.

DETAILED DESCRIPTION OF THE PREFERRED EMBODIMENT

Figure 1:
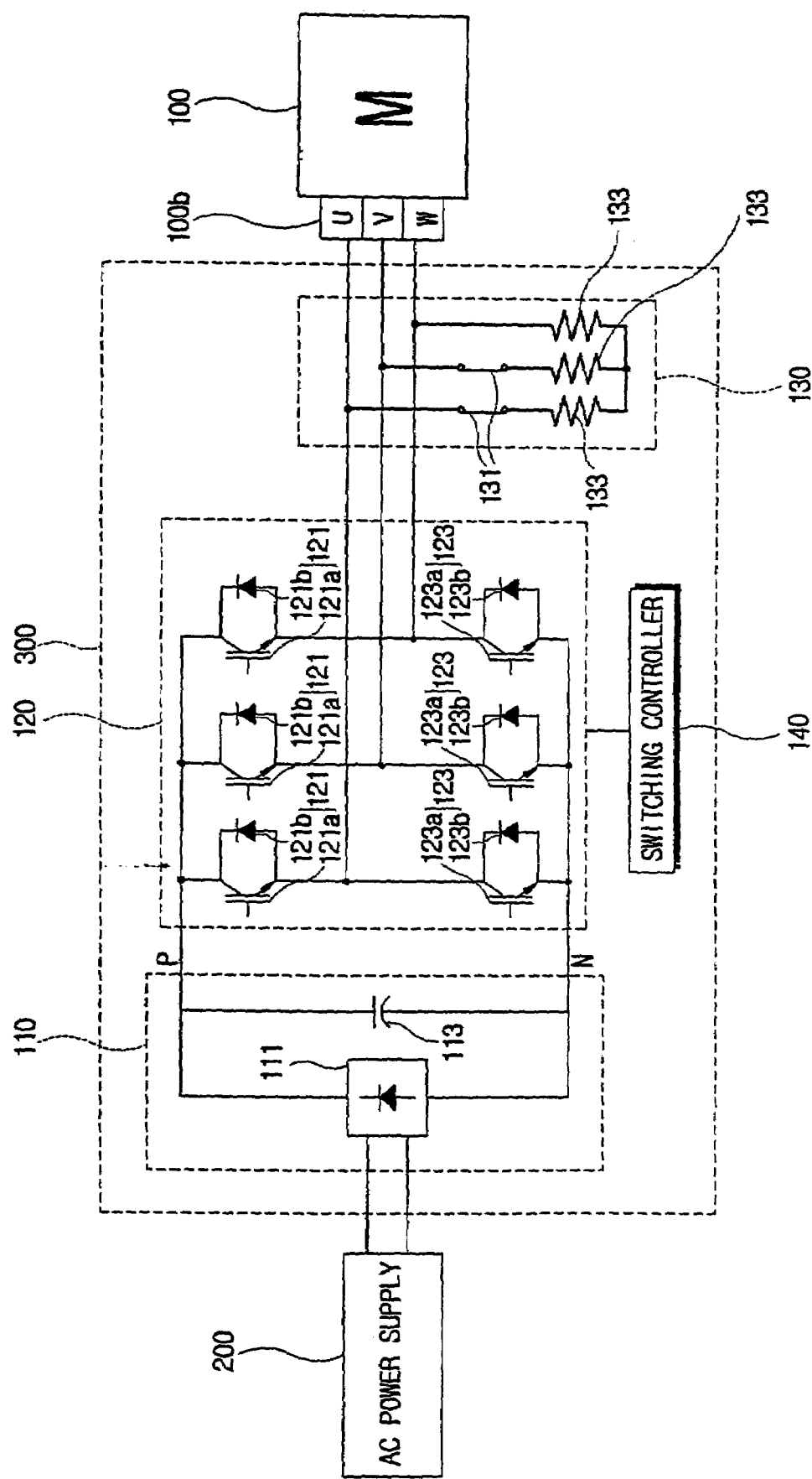
FIG. 1 is a circuit of a conventional motor control apparatus.

Reference will now be made in detail to the embodiment of the present invention, examples of which are illustrated in the accompanying drawings, wherein like reference numerals refer to like elements throughout. The embodiments are described below in order to explain the present invention by referring to the figures.

Figure 2:
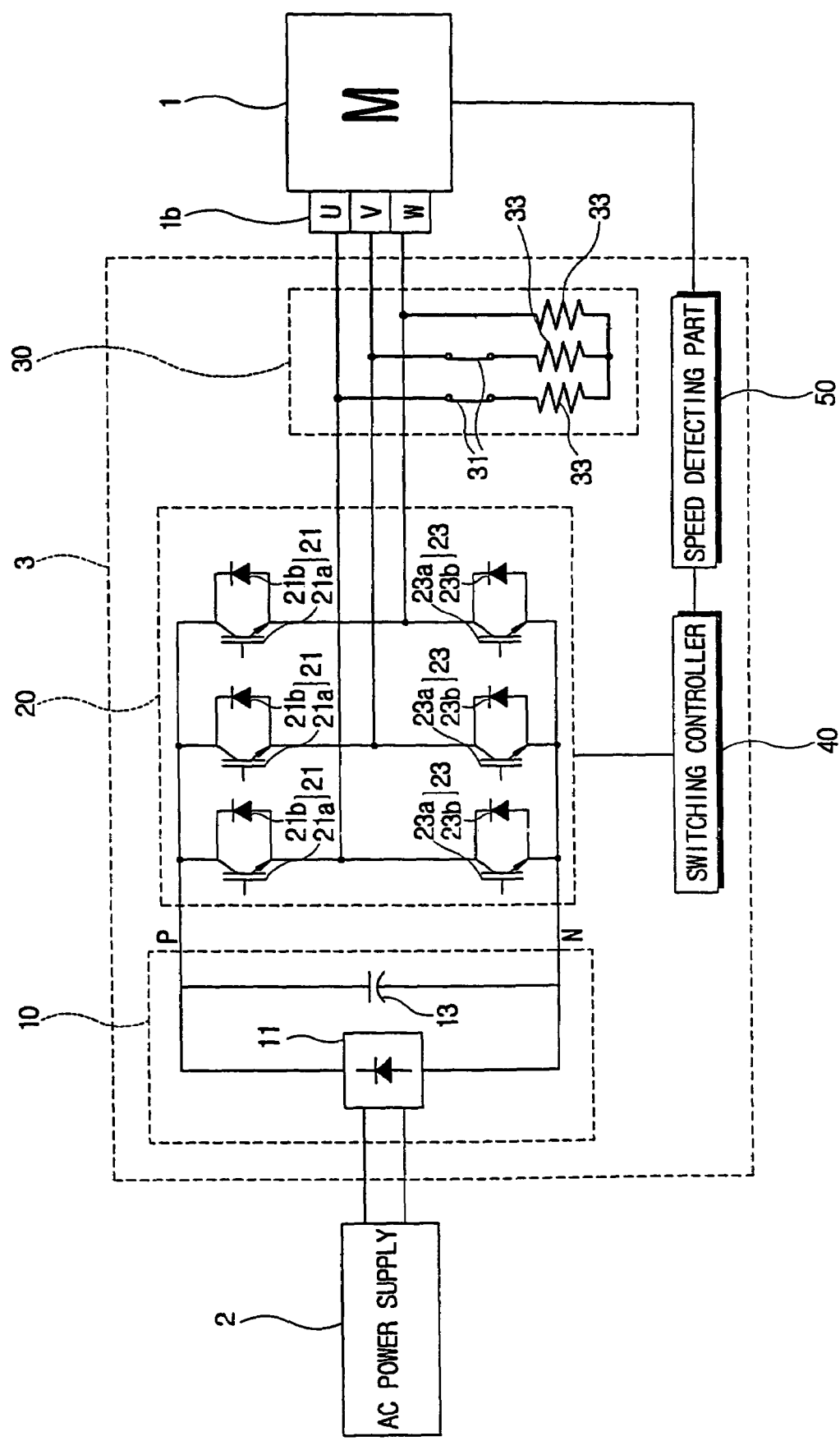
FIG. 2 is a circuit of a motor control apparatus according to an embodiment of the present invention.

A motor control apparatus 3 according to an embodiment of the present invention, as shown in FIG. 2, comprises a rectifying circuit part 10 rectifying a commercial AC power (110V/220V) supplied from an AC power supply 2, and an inverting part 20 inverting a DC power rectified by the rectifying circuit part 10 into AC power having various frequencies and supplying the AC power having various frequencies to a motor 1. Further, the motor control apparatus 3 comprises a dynamic braking circuit 30 having brake relays 31 and brake resistors 33 to perform a dynamic braking operation.

The rectifying circuit part 10 comprises a diode rectifying circuit 11 rectifying the commercial AC power supplied from the AC power supply 2 into the DC power, and a capacitor 13 smoothing the DC power rectified by the diode rectifying circuit 11 to a predetermined voltage and then transmitting the DC power to the inverting part 20.

The inverting part 20 comprises a bridge circuit provided with a plurality of first switching units 21 each having a first transistor 21a, and a first diode 21b connected to each other in parallel and a plurality of second switching units 23 each having second transistor 23a, and second diode 23b connected to each other in parallel. Respective ones of the first and second switching units 21 and 23 are provided in pairs in respective bridges of the bridge circuit, and tap nodes between the first and second switching units 21 and 23 of each of the respective bridges are connected to respective motor windings 1a of the motor 1 via power input ends 1b of the motor 1 (refer to FIGS. 3 and 4). The respective first and second switching units 21 and 23 are turned on and turned off by a control signal of a switching driver (not shown). The switching driver controls the respective first and second switching units 21 and 23 according to a control signal of a switching controller 40. The switching controller 40 selectively turns on and turns off the respective first and second switching units 21 and 23, and thus supplies AC power having the various frequencies to the motor 1 through the tap nodes of the bridges.

The brake relays 31 are turned on when the motor 1 brakes and short circuits the motor windings of the motor 1 to suddenly brake the motor 1. Further, the brake relays 31 are maintained on when the motor 1 is stopped, to prevent the motor 1 from rotating by an external force.

The brake resistors 33 are connected to the respective motor windings 1a of the motor 1 when the brake relays 31 are turned on, which makes an overcurrent generated from the motor windings 1a when the motor 1 suddenly brakes be consumed as heat, to prevent the motor 1 or the brake relays 31 from being damaged.

Further, the switching controller 40 performs the dynamic braking operation with the brake relays 31 and the brake resistors 33. When the brake relays 31 short circuit the motor windings 1a, the switching controller 40 turns on and turns off the first or second switching units 21 or 23 provided in one of opposite ends of the inverting part 20 so that the overcurrent consumed by the brake resistors 33 is changeable in proportion to the rotation speed of the motor 1. Further, the motor control apparatus 3 may further comprise a speed detecting part 50 detecting the rotation speed of the motor 1, and the switching controller 40 turns on and turns off the first and second switching units 21 and 23 based on the rotation speed of the motor 1 detected by the speed detecting part 50.

Figure 3:
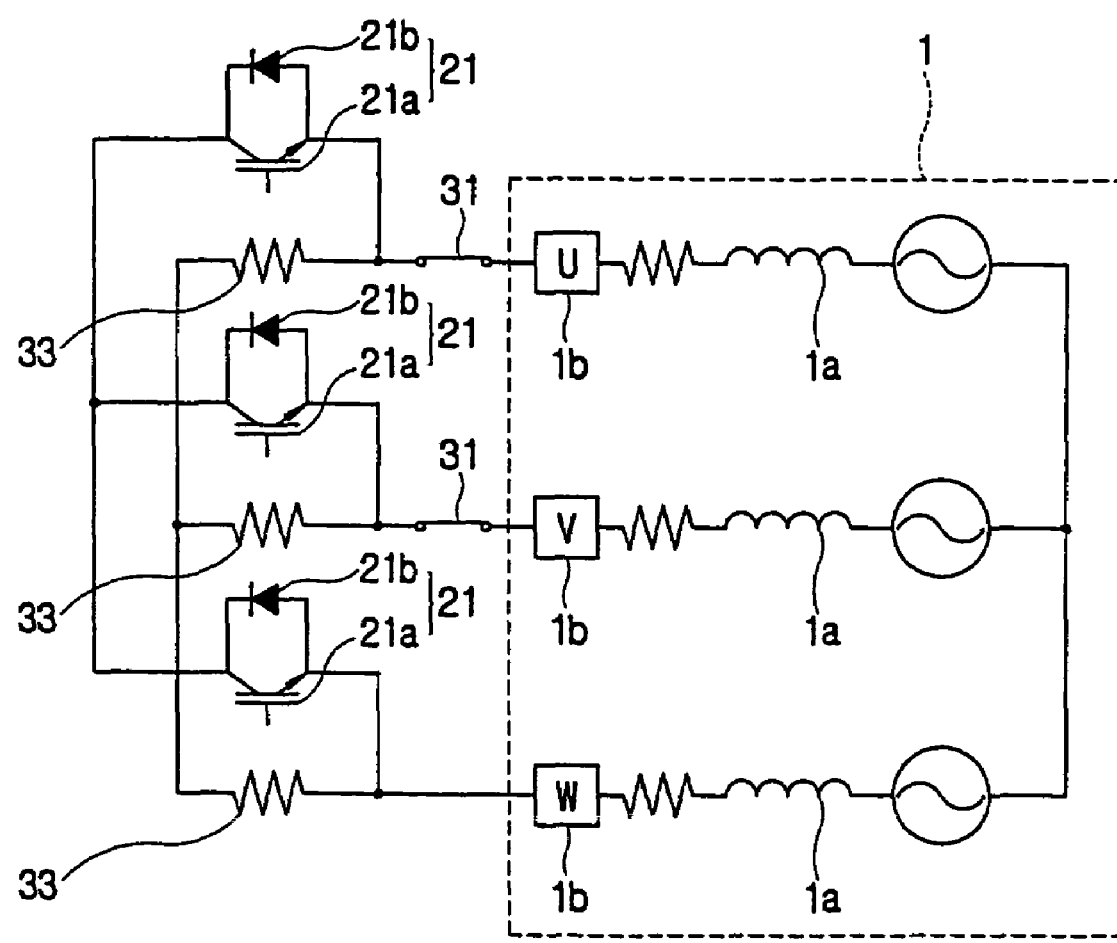
FIGS. 3 and 4 are circuits that are configured when the motor control apparatus according to the embodiment of the present invention performs a dynamic braking operation.
Figure 4:
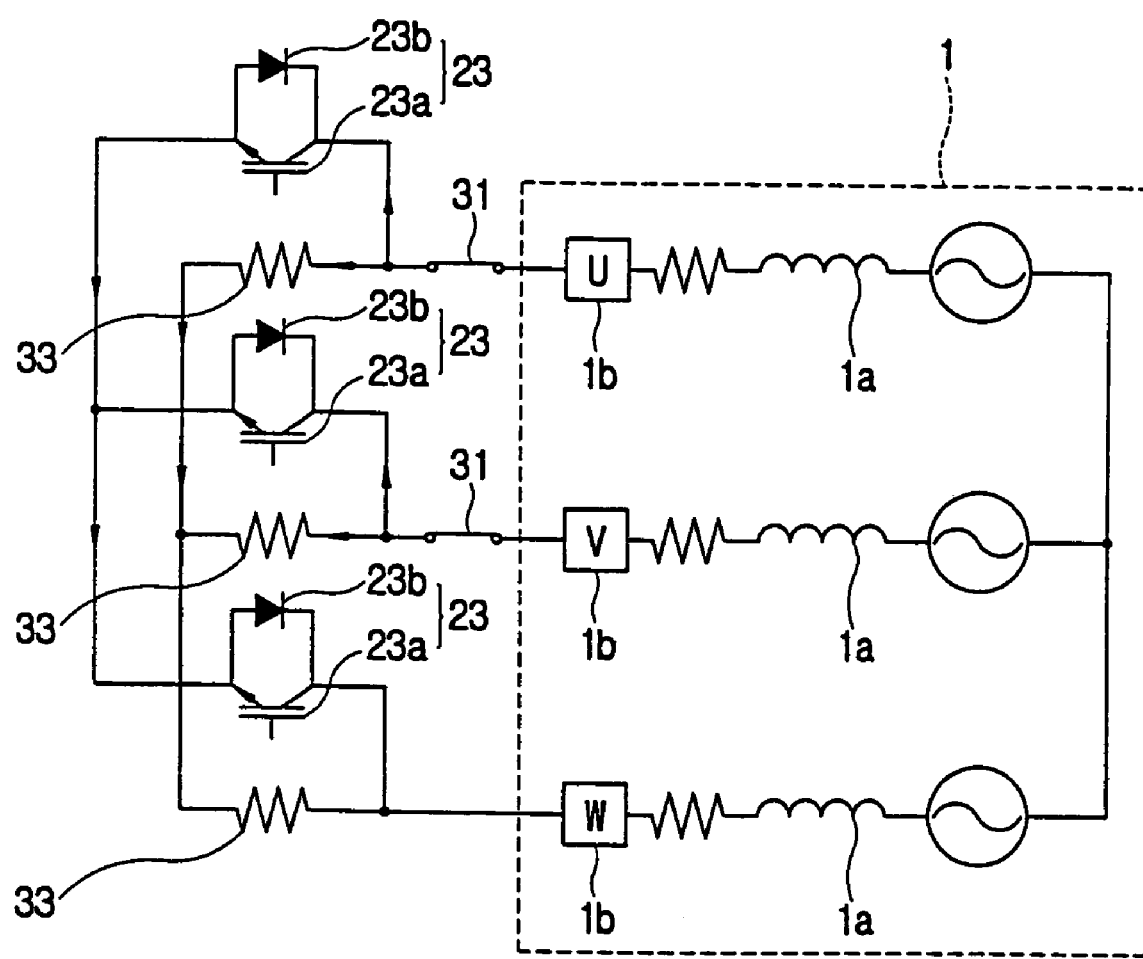

FIG. 3 illustrates a circuit in which the first switching units 21 provided in an upper end P of the inverting part 20 are turned on and turned off when the motor 1 brakes. FIG. 4 illustrates a circuit in which the second switching units 23 provided in a lower end N of the inverting part 20 are turned on and turned off when the motor 1 brakes.

With reference to FIG. 3, when the motor 1 brakes, power supplied from the rectifying circuit part 10 to the inverting part 20 is cut off, and respective brake relays 31 are turned on, to short circuit the motor windings 1a of the motor 1. The overcurrent is generated in proportion to the rotation speed of the motor 1 in the motor windings 1a of the motor 1 by inertia of the motor 1, and the generated overcurrent is transmitted into the brake resistors 33. The switching controller 40 turns on and turns off the first switching units 21 provided in the upper end P of the inverting part 20 so that the overcurrent consumed by the brake resistors 33 is changeable in proportion to the rotation speed of the motor 1. That is, information of the rotation speed of the motor 1 detected by the speed detecting part 50 is transmitted to the switching controller 40, and then the switching controller 40 controls the first switching units 21 to turn on and turn off by a duty cycle or a duty factor changed in proportion to the rotation speed of the motor 1. The duty cycle is defined as a ratio of a turn-on time to a switching period of the first switching units 21. As the duty cycle increases, the overcurrent consumed by the brake resistors 33 decreases.

For example, as the rotation speed of the motor 1 is high, the overcurrent generated from the motor 1 is large, and the switching controller 40 controls the first switching units 21 of the inverting part 20 to have a small duty cycle. The turn-on time of the first switching units 21 decreases, as the first duty cycle becomes smaller and the overcurrent consumed by the brake resistors 33 increases to prevent the motor 1 and the brake relays 31 from being damaged.

Further, because the overcurrent generated from the motor 1 is small when the rotation speed of the motor 1 is low, the switching controller 40 controls the first switching units 21 of the inverting part 20 to have a large duty cycle. The turn-on time of the first switching units 21 increases as the duty cycle becomes larger and the overcurrent consumed by the brake resistors 33 decreases and the overcurrent flowing through the first switching units 21 increases, to improve the effect of the dynamic braking operation.

That is, when the first switching units 21 are turned on, the overcurrent from the motor 1 is shunted through the first switching units 21 and the overcurrent flowing through the brake relays 31 and brake resistors 33 is reduced or eliminated, and, when the first switching units are turned off, the overcurrent from the motor flows through the brake relays 31 and the brake resistors 33 and the overcurrent flowing through the first switching units 21 is eliminated. Thus power from the motor 1, when the overcurrent is generated is consumed in the brake resistors 33 in proportion to the time the first switching units 21 are turned off.

Further, when the motor 1 brakes, the second switching units 23 provided in the lower end N of the inverting part 20 operate in the same way as turning on and off the first switching units 21 of the inverting part 20, except that a configuration of the first and second transistors 21a and 23a and the first and second diodes 21b and 23b are different from each other, thus a description of the latter will be omitted.

Figure 5:
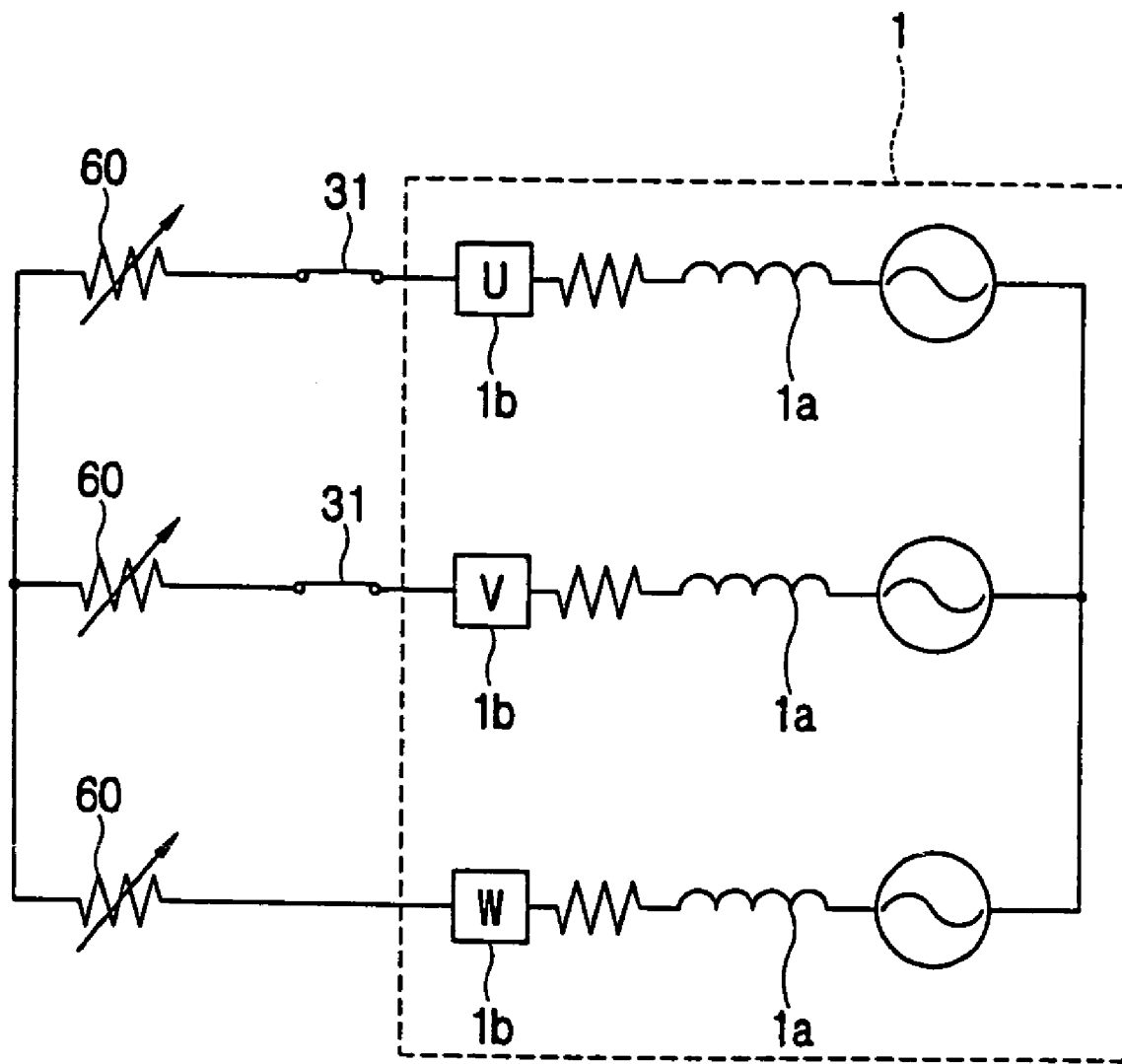
FIG. 5 is an example of a circuit performing the same operation as the circuits of FIGS. 3 and 4.

As described above, when the motor 1 brakes, changing the overcurrent consumed by the brake resistors 33 by turning on and turning off the first or second switching units 21 or 23 in one of upper and lower ends P and N of the inverting part 20, as shown in FIG. 5, produces an equivalent effect as connecting variable resistors 60 to the respective motor windings 1a of the motor 1, wherein change of resistances of the variable resistors 60 are inversely proportional to the duty cycle of the first and second switching units 21 and 23.

The motor control apparatus 3 controlling the motor 1, which is a three-phase motor, is described by way of example, but the present invention can be applied to a motor control apparatus controlling a one-phase motor or a multiple-phase motor.

Further, in the above configuration, the motor control apparatus 3 comprises the rectifying circuit part 10, the inverting part 20 and a dynamic braking circuit 30, but may further comprise circuits having various functions, such as an inrush current protection circuit or an overcurrent protection circuit.

Further, in the above configuration, the first and second switching units 21 and 23 have the first and second transistors 21a and 23a, and the first and second diodes 21b and 23b connected in parallel, but may have other circuit configurations to turn on and turn off both ends of the respective bridges.

With the above configuration, when the brake relays 31 short circuit the motor windings 1a, the equivalent effect as connecting the variable resistors to the motor windings 1a of the motor 1 is obtainable without extra variable resistors 60 by turning on and turning off the first or second switching units 21 or 23 provided in one of the upper and lower ends P and N of the inverting part 20 so that the overcurrent consumed by the brake resistors 33 is changed in proportion to the rotation speed of the motor 1. Thus, the effect of the dynamic braking operation of the motor 1 corresponding to the rotation speed of the motor 1 may be improved, and the motor 1 and the brake relays 31 are prevented from being damaged by appropriately consuming the overcurrent generated when the motor 1 brakes.

As is described above, a motor control apparatus and a method thereof capable of improving an effect of a dynamic braking operation and preventing a breakdown thereof is provided. Thus, an overcurrent, generated when the motor breaks and consumed by brake resistors, is changed according to a rotation speed of the motor.

Although an embodiment of the present invention has been shown and described, it will be appreciated by those skilled in the art that changes may be made in the embodiments without departing from the principles and spirit of the invention, the scope of which is defined in the appended claims and their equivalents.

What is claimed is:

1. A motor control apparatus supplying AC power to a motor having a plurality of motor windings, comprising:
    an inverting part comprising:
        a bridge circuit having a plurality of first and second switching units, and supplying the AC power to the motor;
    brake relays short circuiting the motor windings by turning on when the motor brakes;
    brake resistors, respectively, connected to the plurality of motor windings and consuming an overcurrent generated by the motor when the brake relays short circuit the plurality of motor windings; and
    a switching controller directly turning on and turning off one of the first and second switching units provided in respective opposite ends of the inverting part so that the overcurrent consumed by the brake resistors is changeable in proportion to a rotation speed of the motor, when the brake relays short circuit the plurality of motor windings,
    wherein the overcurrent consumed by the brake resistors is changed in proportion to a duty cycle of the first and second switching units turned on and turned off by the switching controller.

2. The motor control apparatus according to claim 1, further comprising:
    a speed detecting part detecting the rotation speed of the motor, wherein the switching controller turns on and turns off the first and second switching units so that the duty cycle of one of the first and second switching units is in proportion to the rotation speed of the motor detected by the speed detecting part.

3. The motor control apparatus according to claim 1, wherein each of the first and second switching units of the inverting part comprises:
    a transistor; and
    a diode connected in parallel to the transistor.

4. A control method of a motor control apparatus having an inverting part comprising a bridge circuit including a plurality of first and second switching units, and supplying AC power to a plurality of motor windings of a motor, and brake resistors connected to the plurality of motor windings and consuming an overcurrent generated from the motor when the motor brakes, comprising:

braking the motor by short circuiting the plurality of motor windings; and directly turning on and turning off one of the first and second switching units provided in respective opposite ends of the inverting part so that the overcurrent consumed by the brake resistors is changeable according to a rotation speed of the motor, wherein the overcurrent consumed by the brake resistors is changed in proportion to a duty cycle of the one of the first and second the switching units turned on and turned off.

5. The control method of the motor control apparatus according to claim 4, further comprising:

detecting the rotation speed of the motor, wherein turning on and turning off the one of the first and second switching units comprises:

turning on and turning off the first and second switching units according to the duty cycle changed in proportion to the detected rotation speed of the motor.

6. A motor control apparatus supplying power to a motor having a plurality of motor windings, comprising:

a plurality of switching units to supply AC power to the motor;

brake resistors, respectively, connected to the plurality of motor windings to exhaust power from an overcurrent generated by the motor; and a controller to directly control selected ones of the plurality of switching units so that the power exhausted by the brake resistors corresponds to a rotation speed of the motor, wherein the overcurrent consumed by the brake resistors is changed in proportion to a duty cycle of the switching units turned on and turned off by the controller.

7. The motor control apparatus according to claim 6, further comprising:

a speed detecting part detecting the rotation speed of the motor, wherein the switching controller turns on and turns off the switching units in accordance with the rotation speed of the motor.

8. The motor control apparatus according to claim 7, wherein the plurality of switching units comprises:

a first plurality of switching units and a second plurality of switching units connected, respectively, in parallel to supply the AC power to the motor, wherein the controller turns on and turns off the first plurality of switching units and the second plurality of switching units so that the duty cycle of one of the first and second switching units is in proportion to the rotation speed of the motor detected by the speed detecting part.

9. The motor control apparatus according to claim 8, wherein each of the first and second switching units comprises:

a transistor; and a diode connected in parallel to the transistor.

10. The motor control apparatus according to claim 6, further comprising:

brake relays to short circuit the motor windings by turning on when the motor brakes and to prevent the motor from rotating by an external force by being maintained on when the motor is stopped.

11. The motor control apparatus according to claim 7, wherein the speed detecting part transmits information of the detected speed of the motor to the controller to control the selected ones of the plurality switching units to turn on and turn off by the duty cycle changed in proportion to the rotation speed of the motor.

12. The motor control apparatus according to claim 8, wherein, when one or more of the one of the first and second plurality of switching units are turned on, the overcurrent from the motor is shunted through the one or more of the one of the first and second plurality of switching units and the overcurrent flowing is reduced or eliminated through respective ones of the brake resistors connected between the one of the first and second plurality of switching units, and, when the first and second plurality of switching units are turned off, the overcurrent from the motor flows through the brake resistors and is prevented from flowing through the one of the first and second plurality of switching units.

13. The motor control apparatus according to claim 8, wherein, when the overcurrent is generated, power from the motor is consumed in the brake resistors in proportion to a time of the overcurrent flowing through the brake resistor.

14. The motor control apparatus according to claim 8, wherein the turning on and turning off of the one of the first and second switching units comprises:

when the one of the first and second switching units is turned on, shunting the overcurrent from the motor through the one of the first and second switching units and reducing or eliminating the overcurrent flowing through the brake resistors, and when the one of the first and second switching units is turned off, flowing the overcurrent from the motor through the brake resistors and preventing the overcurrent from flowing through the one of the first and second switching units.

* * * * *

UNITED STATES PATENT AND TRADEMARK OFFICE
CERTIFICATE OF CORRECTION

PATENT NO. : 7,368,889 B2  
APPLICATION NO. : 10/689084  
DATED : May 6, 2008  
INVENTOR(S) : Jang-hyoun Youm et al.

It is certified that error appears in the above-identified patent and that said Letters Patent is hereby corrected as shown below:

Column 7, Line 17, Claim 4 after "second" delete "the".

Column 8, Line 19, Claim 11 change "plurality" to --plurality of--.

Signed and Sealed this

Thirtieth Day of September, 2008

JON W. DUDAS  
*Director of the United States Patent and Trademark Office*